(12) United States Patent
Ishikawa et al.

(10) Patent No.: US 8,793,266 B2
(45) Date of Patent: Jul. 29, 2014

(54) GRAPHICAL USER INTERFACE FOR A SEARCH QUERY

(75) Inventors: Shunsuke Ishikawa, Tokyo (JP); Keisuke Nitta, Kanagawa-ken (JP); Takuya Tejima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 13/236,802

(22) Filed: Sep. 20, 2011

(65) Prior Publication Data

US 2012/0084328 A1    Apr. 5, 2012

(30) Foreign Application Priority Data

Sep. 30, 2010   (JP) .................................. 2010-221922

(51) Int. Cl.
*G06F 17/30*   (2006.01)
(52) U.S. Cl.
USPC ........... 707/758; 707/769; 715/204; 715/700; 715/769; 715/968
(58) Field of Classification Search
CPC ............. G03F 17/30392; G03F 17/30554; G03F 17/30395; G03F 17/30699; G03F 17/30011; G03F 17/30967; G03F 17/30424
USPC ........... 707/999.004, 999.003, E17.014, 805, 707/772, 778, 758, 769; 715/204, 700, 769, 715/968
See application file for complete search history.

(56) References Cited

U.S. PATENT DOCUMENTS

| | | | |
|---|---|---|---|
| 7,039,647 B2* | 5/2006 | Lowe et al. ............................ 1/1 |
| 7,421,660 B2* | 9/2008 | Charnock et al. ............. 715/751 |
| 7,730,394 B2* | 6/2010 | Davis et al. .................... 715/235 |
| 7,739,221 B2* | 6/2010 | Lawler et al. .................. 707/770 |
| 8,131,779 B2* | 3/2012 | Jonker et al. .................. 707/811 |
| 2005/0015368 A1* | 1/2005 | Payton et al. ....................... 707/4 |
| 2006/0116999 A1* | 6/2006 | Dettinger et al. ................. 707/4 |
| 2007/0094060 A1* | 4/2007 | Apps et al. ......................... 705/7 |
| 2007/0226204 A1* | 9/2007 | Feldman ......................... 707/5 |
| 2008/0091656 A1* | 4/2008 | Charnock et al. ................. 707/3 |

(Continued)

FOREIGN PATENT DOCUMENTS

JP           11219371         8/1999
JP        2004086350 A       3/2004

(Continued)

OTHER PUBLICATIONS

Cooper et al., Lexical Navigation: Visually Prompted Query Expansion and Refinement, 1997, ACM, pp. 237-246.*

*Primary Examiner* — Leslie Wong
(74) *Attorney, Agent, or Firm* — Susan Murray; Edell, Shapiro & Finnan, LLC

(57) ABSTRACT

Generation of a search query to be issued to a document search engine is supported by providing a GUI creation unit that generates a graphical user interface for supporting generation of a search query. The GUI creation unit generates a query-node creation window that is a GUI window for generating a new search word to be connected to a search query by a logical operator. The query-node creation window includes a sample-document preview area that displays a sample document, a facet list area that displays facets extracted from the sample document in list form, a query-node creation assist area to assist generation of the new search word, and a logical-operator selection icon to select a logical operator that connects the generated search word.

21 Claims, 14 Drawing Sheets

(56) References Cited

U.S. PATENT DOCUMENTS

| | | | |
|---|---|---|---|
| 2008/0228754 A1* | 9/2008 | Frank et al. | 707/5 |
| 2008/0281802 A1* | 11/2008 | Peterson et al. | 707/4 |
| 2009/0094217 A1* | 4/2009 | Dettinger et al. | 707/4 |
| 2009/0106238 A1* | 4/2009 | Lita et al. | 707/5 |
| 2009/0144262 A1* | 6/2009 | White et al. | 707/5 |
| 2012/0084321 A1* | 4/2012 | Dexter et al. | 707/772 |

FOREIGN PATENT DOCUMENTS

| | | |
|---|---|---|
| JP | 2004326216 | 11/2004 |
| JP | 2007226568 A | 9/2007 |
| JP | 2008033687 A | 2/2008 |
| JP | 2009071623 | 4/2009 |
| JP | 2009199576 A | 9/2009 |

* cited by examiner

FIG. 2

GRAPHICAL USER INTERFACE FOR A SEARCH QUERY

BACKGROUND

The present invention relates in general to supporting creation of a search query, and more specifically, to providing a graphical user interface for simplifying creation, correction, and verification of a search query having a complicated logical structure.

A great many text documents are stored in companies from day to day. Examples include call center contact histories, users' responses to questionnaires, trouble reports, quality information, and sales journals. In recent years, many companies perform the following work-improving cycle using such text information to increase customer satisfaction and reduce corporate risks. First, a large volume of accumulated text information is analyzed by a computer, from which some information related to customer satisfaction and corporate risks is obtained. Next, an action plan is created and executed on the basis of the information obtained. Thereafter, the effects of the executed action plan are verified by analyzing the text information. As a result, if it is determined that expected effects have not been obtained, a hypothesis for its cause is set up by further analyzing the text information, and a new action plan is created and executed on the basis of it.

What is essential in such a work-improving cycle is a technique called text mining in which tacit knowledge present in a text group is turned into explicit knowledge, a certain feature or tendency is found in a text group, or correlation is found between different kinds of text groups.

Here, a document search operation that analysts who are specialized in text mining usually perform will be described using an example of an analyst of a mobile phone company who focuses attention on damage to mobile phones caused by water. The analyst first selects a sample document that describes "damage caused by water" from stored text (for example, complaint mails sent to a support center) and extracts therefrom a specific keyword or sentence pattern common to the description of "damage caused by water". Next, the analyst creates a search query from the extracted keyword or sentence pattern using a suitable search rule. Finally, the analyst issues the created search query to a document search engine to perform a search to thereby check the content of hit text group in detail.

If the hit text group does not include many expected documents, it shows that the created search query is not suitable. In such a case, the analyst corrects the search query and issues it again to the search engine to perform a search. The analyst repeats the series of operations and stores a search query with which many expected documents can be obtained as a search query for "damage caused by water".

Thereafter, the analyst performs continuous searches for a text group sent from users, continuously using the created and stored search query, and accumulates hit documents. By analyzing the information accumulated in this way, the analyst finds a measure of "damage caused by water", on the basis of which the analyst creates an action plan.

BRIEF SUMMARY

Embodiments of the present invention provide a system, method and computer program product that simplify generation or creation, correction, and verification of a search query having a complicated logical structure.

In an embodiment of the present invention, generation of a search query to be issued to a document search engine includes providing a GUI creation unit that generates a graphical user interface to support generation of a search query. The GUI creation unit generates a query-node creation window that is a GUI window for generating a new search word to be connected to a search query by a logical operator, the query-node creation window including a sample-document preview area that displays a sample document, a facet list area that displays facets extracted from the sample document in list form, a query-node creation assist area to assist generation of the new search word, and a logical-operator selection icon to select a logical operator that connects the generated search word.

BRIEF DESCRIPTION OF THE DRAWINGS

FIG. 2 is a diagram showing a GUI screen that the search-query creation support apparatus of the embodiment creates.

DETAILED DESCRIPTION

Figure 1:
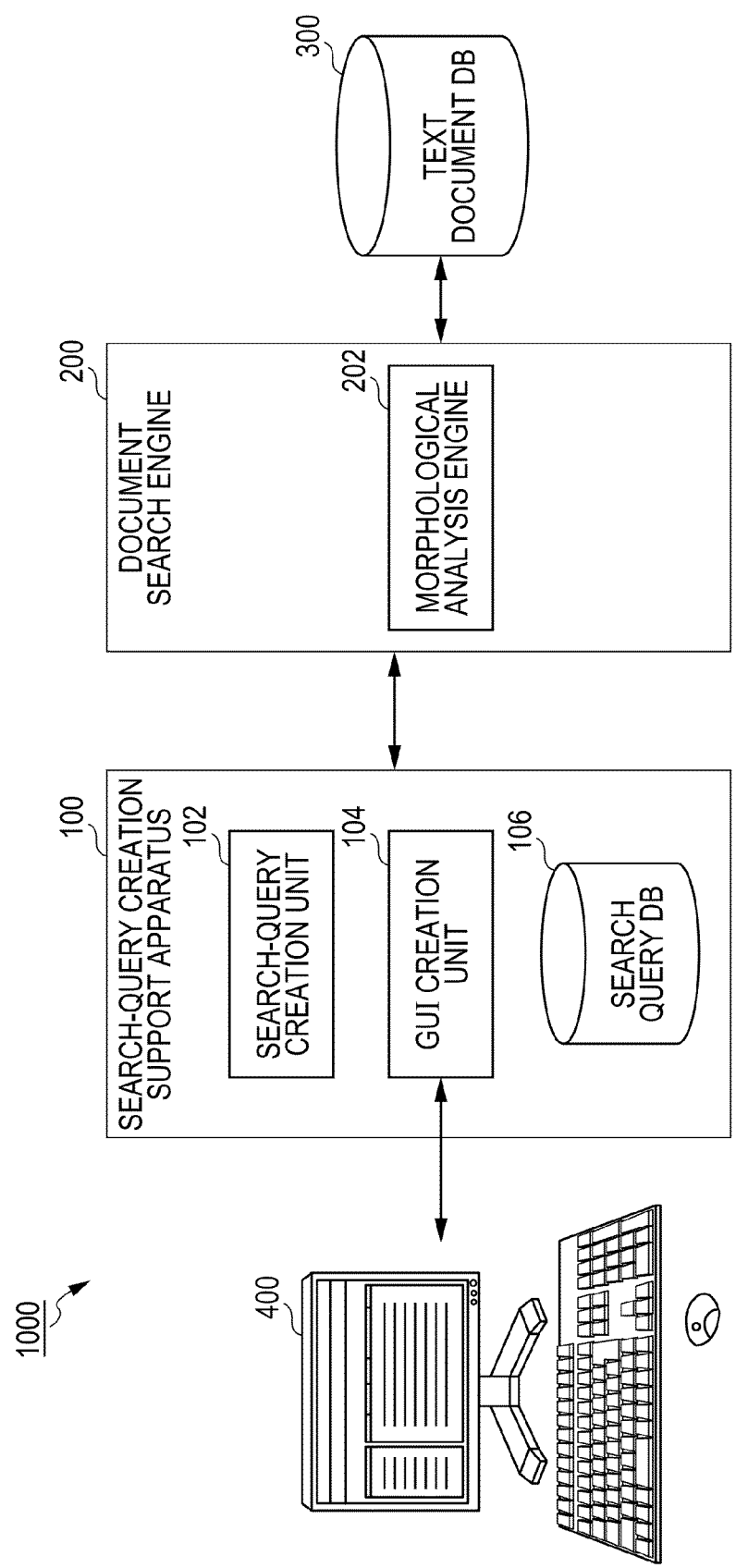
FIG. 1 is a diagram showing a document search system including a search-query creation support apparatus of an embodiment.

In accordance with embodiments of the invention, a configuration is provided that simplifies generation or creation, correction, and verification of a search query having a complicated logical structure. A GUI window is provided having a configuration in which, in response to dragging a word included in a sample document or clicking on a facet in a facet list, a search formula is automatically generated or created from the dragged word or the clicked facet in accordance with a search rule that a document search engine supports. In addition, the number of search hit results of a search word is displayed on the GUI window so that the validity of the search word can be estimated by the user.

Although the present invention will be described hereinbelow with reference to an embodiment described in the drawings, the present invention is not limited to the embodiment shown in the drawings. In the following reference drawings, common components are denoted by the same signs, and descriptions thereof will be omitted as appropriate.

FIG. 1 shows a document search system 1000 including a search-query creation support apparatus 100 that is an embodiment of the present invention. The document search system 1000 is a system that can be used in text mining and includes a search-query creation support apparatus 100, a document search engine 200, and a text document database 300. The document search engine 200 includes a morphological analysis engine 202.

The search-query creation support apparatus 100 of this embodiment includes a search-query creation unit 102 for generating or creating a search query to be issued to the document search engine 200, a GUI creation unit 104 that generates or creates a graphical user interface (hereinafter referred to as a GUI) for supporting creation of the search query, and a search query database 106 for storing the created search query. The function of the search-query creation support apparatus 100 of this embodiment will be specifically described with reference to a GUI screen displayed on a display unit 400. The following description is made using text mining, by way of example, performed to find "the relationship between compression in OS and problems caused by startup of a computer" for ease of understanding.

Figure 2:
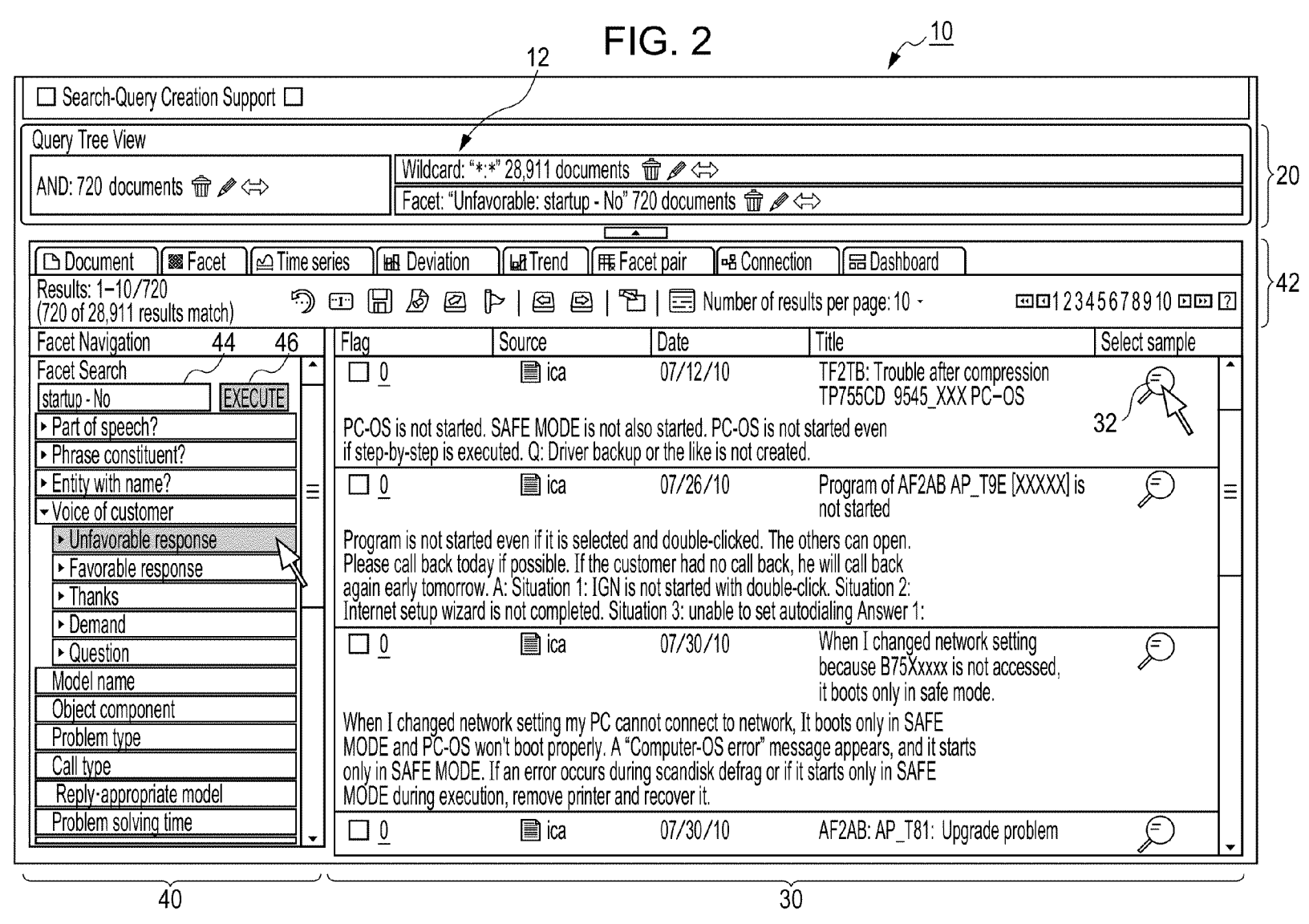

FIG. 2 shows an example of a GUI screen that the GUI creation unit 104 of the search-query creation support apparatus 100 of this embodiment creates. As shown in FIG. 2, the GUI screen 10 of this embodiment displays a query tree view area 20 that seamlessly displays, on the same layer, the logical structure of a search query as a tree view and a hit-document-list display area 30 for displaying hit documents as search results. Furthermore, the GUI screen 10 includes a list box 40 for selecting a facet (attribute) from text documents accumulated in the database and a toolbar area 42 in which various icons etc., such as an icon for storing a created search query, are disposed.

The analyst first clicks on an item expressed as "Voice of Customer/Unfavorable response" in the list box 40 so that it is designated, enters a keyword, "startup—No", in the text field 44 titled "Facet Search", and clicks on an execute button 46. The search-query creation unit 102 of the search-query creation support apparatus 100 creates a search query in response to the above operation. Here, the search query is defined as a character string formed of a combination of a logical operator (AND, OR, or NOT) and a search word, and is a query (process request) to the document search engine 200. In the example shown in FIG. 2, the search-query creation unit 102 creates the following search query in response to the above operation via the GUI screen 10,
a search formula, *:*/"keyword$._voc.bad"/"startup—No"
and issues it to the document search engine 200. The document search engine 200 executes searching using the issued search query and returns search results to the search-query creation support apparatus 100.

The GUI creation unit 104 of the search-query creation support apparatus 100 that has received the search results from the document search engine 200 creates the query tree view 12, which is a visualized logical structure of the issued search query expressed as
a search formula, *:*/"keyword$._voc.bad"/"startup—No",
and creates a list of hit documents to be displayed in the hit-document-list display area 30, and displays it on the GUI screen 10. The hit-document-list display area 30 displays, in addition to the content of documents hit by the searching, titles, dates, and other bibliographical information. The analyst checks the content of individual hit documents in detail while scrolling the hit-document-list display area 30 to select, as a sample document, the most noteworthy document from the documents describing "compression in OS and problems caused by startup of a computer". Next, the analyst extracts a keyword and a sentence pattern specific to the document describing "compression in OS and problems caused by startup of a computer" from the selected sample document and creates the most suitable search query using them. A series of operations for creating the most suitable search query will be described hereinafter in detail.

Figure 3:
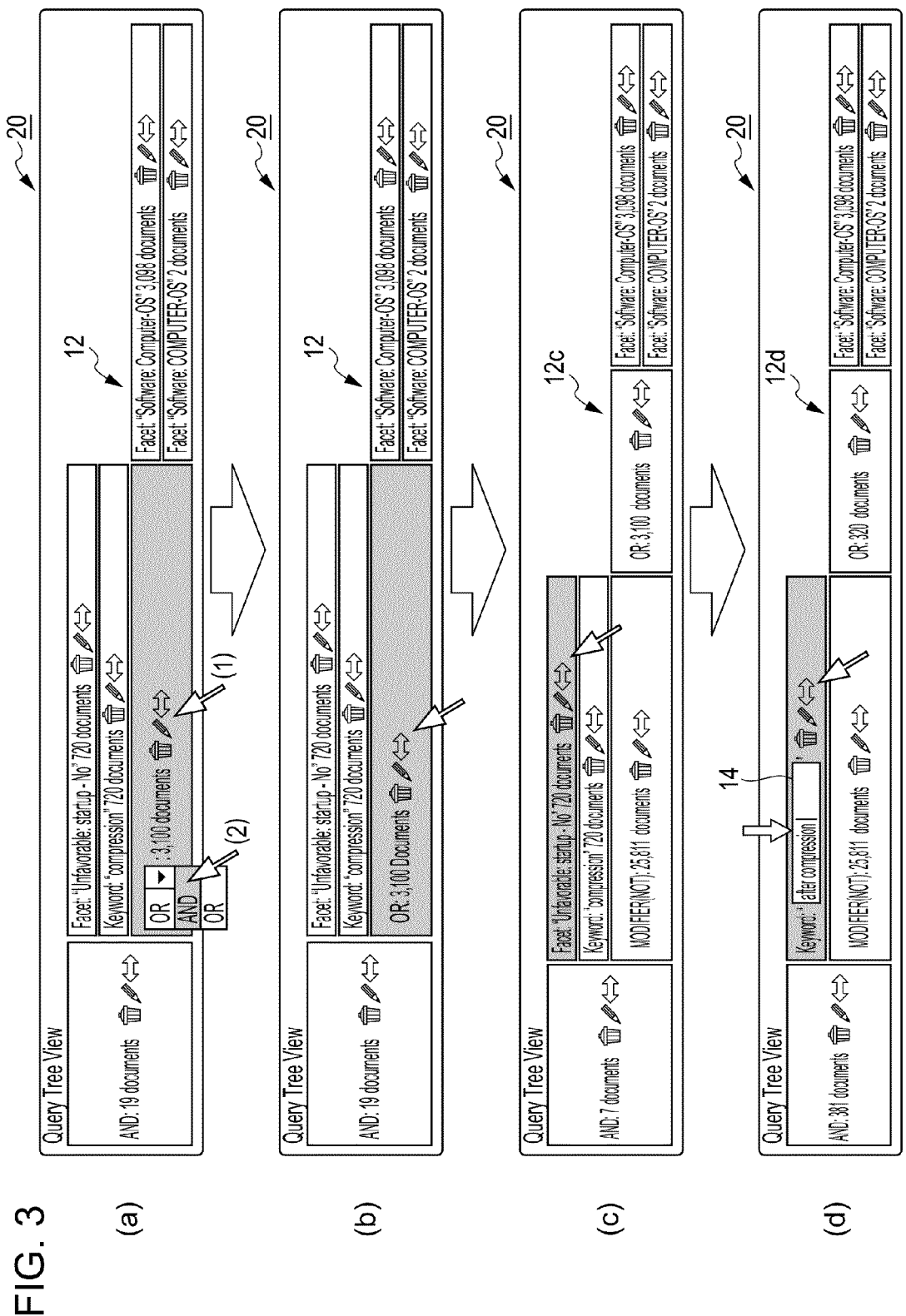
FIG. 3 is a diagram showing a query tree view area of the GUI screen 10 of the embodiment.

First, the query tree view of this embodiment will be described with reference to FIG. 3. FIG. 3 shows only the query tree view area 20 extracted from the GUI screen 10 of this embodiment. The search query is composed of a logical operator and a search word, as described above. Here, in the present invention, the search word is referred to, as a single word or phrase, or a single word or phrase modified by a search modifier. FIG. 3(*a*) shows the query tree view 12 as a visualized expression of the logical structure of a search query expressed as
a search formula,

---

/"keyword$._voc.bad"/"startup - No" compression
(/"keyword$.sem_software"/"Computer-OS"
OR/"keyword$.sem_software"/"COMPUTER-OS").

---

As shown in FIG. 3(*a*), the query tree view 12 is a tree view in which a logical operator and a search word are taken as nodes and is configured as an aggregate of a node icon indicating a logical operator (hereinafter referred to as a logical operator node) and a node icon indicating a search word (hereinafter referred to as a search word node). In the query tree view 12, a logical operator node is disposed as a top-level node at the left of the screen, and lower-level nodes are disposed at the right of the logical operator node. Of the node icons, at least two node icons are disposed at a lower layer closest to the logical operator node. Of the at least two node icons, at least one is a search word node, and the other can be a logical operator node.

In the query tree view 12 shown in FIG. 3(*a*), three icons: a search word node expressed as [Facet: "Unfavorable: startup—No" 720 documents], a search word node expressed as [Keyword: "compression" 720 documents], and a logical operator node expressed as [OR: 3,100 documents] are disposed at a lower layer closest to the logical operator node expressed as [AND: 19 documents], and two icons: a search word node expressed as [Facet: "Software: Computer-OS" 3,098 documents] and a search word node expressed as [Facet: "Software: COMPUTER-OS" 2 documents] are disposed at a lower layer closest to the logical operator node expressed as [OR: 3,100 documents].

In the query tree view 12 shown in FIG. 3(*a*), the search word node expressed as [Facet: "Software: Computer-OS" 3,098 documents] is linked to hit documents (3,098 documents) found by a facet search using "software: Computer-OS", and the search word node expressed as [Facet: "Software: COMPUTER-OS" 2 documents] is linked to hit documents (2 documents) found by a facet search using "software: COMPUTER-OS". The logical operator node, expressed as [OR: 3,100 documents], located at a higher level closest to the two icons, is linked to documents that are the logical sum of the above two document groups (3,100 documents). Likewise, the search word node expressed as [Facet: "Unfavorable: startup—No" 720 documents] is linked to documents (720 documents) hit by a facet search using "Unfavorable: startup—No", and the search word node expressed as [Keyword: "compression" 720 documents] is linked to documents (720 documents) hit by a keyword search using "compression". A document group (19 documents) that is the logical product of three document groups, that is, the two document groups and the document group (3,100 documents) that are the logical sum of the above-described two document groups, is linked to the logical operator node expressed as [AND: 19 documents] located at the top level. This embodiment is configured such that the node icons constituting the query tree view 12 can be directly edited, and the search-query creation unit 102 creates a search query on the basis of the edition. This will be described hereinbelow.

In the query tree view 12, the individual node icons include various icons for directly editing corresponding logical operators or search words. The logical operator nodes include an icon for editing the content thereof (in the example shown in FIG. 3, the icon is a "pencil" icon). For example, for the logical operator node expressed as [OR: 3,100 documents] in the query tree view 12 of FIG. 3(*a*), in the case where the logical operator is to be changed from "OR" to "AND", when the "pencil" icon is clicked on, a pull-down menu for selecting a logical operator appears under the logical operator in response to it. For example, when "AND" is clicked on, the logical operator of the node changes to "AND".

Furthermore, the node icons each include an icon for reversing the content (in the example shown in FIG. 3, "double arrow"). In the case where the logical operator node expressed as [OR: 3,100 documents] in the query tree view 12 shown in FIG. 3(*b*) is to be reversed, the "double arrow" icon is clicked on. Then, in response to it, as shown in FIG. 3(*c*), a logical operator node expressed as [MODIFIER(NOT): 25,811 documents] is displayed at a higher layer closest to the logical operator node expressed as [OR: 3,100 documents]. This icon is linked to 25,811 documents corresponding to the exclusive OR of the documents linked to the logical operator node expressed as [OR: 3,100 documents]. Along therewith, the displayed results of the logical operator node expressed as [AND: 19 documents] at the top level changes from [19] to [7].

Furthermore, the node icons each include an icon for deleting a corresponding one of the nodes (in the example shown in FIG. 3, "trash box"). For example, in the case where the search word node expressed as [Facet: "Unfavorable: startup—No" 720 documents] in a query tree view 12*c* shown in FIG. 3(*c*) is to be deleted, the "trash box" icon included in the search word node is clicked on. Then, in response to it, as shown in FIG. 3(*d*), the search word node expressed as [Facet: "Unfavorable: startup—No" 720 documents] (that is, the search word indicated by the icon) is deleted. Along therewith, the display results of the logical operator node expressed as [AND: 19 documents] at the top level changes from [7] to [381]. The logical operator node can also be deleted in the same procedure, in which case all node icons located lower than the logical operator node (that is, all search words that drop down from the logical operator indicated by the icon) are deleted.

Furthermore, the content of each search word node can also be directly edited by clicking the "pencil" icon. For example, when the "pencil" icon included in the search word node expressed as [Keyword: "compression" 720 documents] included in the query tree view 12*d* shown in FIG. 3(*d*) is clicked on, a text field 14 for entering a keyword appears in response thereto, as shown in FIG. 3(*d*). By directly entering a new keyword (for example, "after compression") into the text field 14, the content of the search word that the search word node expresses can be changed.

As described above, with the query tree view 12 of this embodiment, the analyst can visually ascertain the logical structure of a search query, and thus, even a search query formed of a very long character string in which a plurality of logical operators are complicated can be partly edited intuitively and easily. While the query tree view of this embodiment has been described, a GUI for supporting the work of adding a new word to a search query will be described.

Refer again to FIG. 2. Icons 32 for selecting individual hit documents are displayed at the right of the hit-document-list display area 30. The analyst fully checks the content of the individual hit documents displayed in the hit-document-list display area 30, and as a result, selects a document titled "TF2TB: Trouble after compression" as a sample document and clicks on the corresponding icon 32. In response to it, the GUI creation unit 104 activates a GUI window that supports easy creation of a new search word to be added to the search query. In the following description, this GUI window is referred to as "query node builder".

Figure 4:
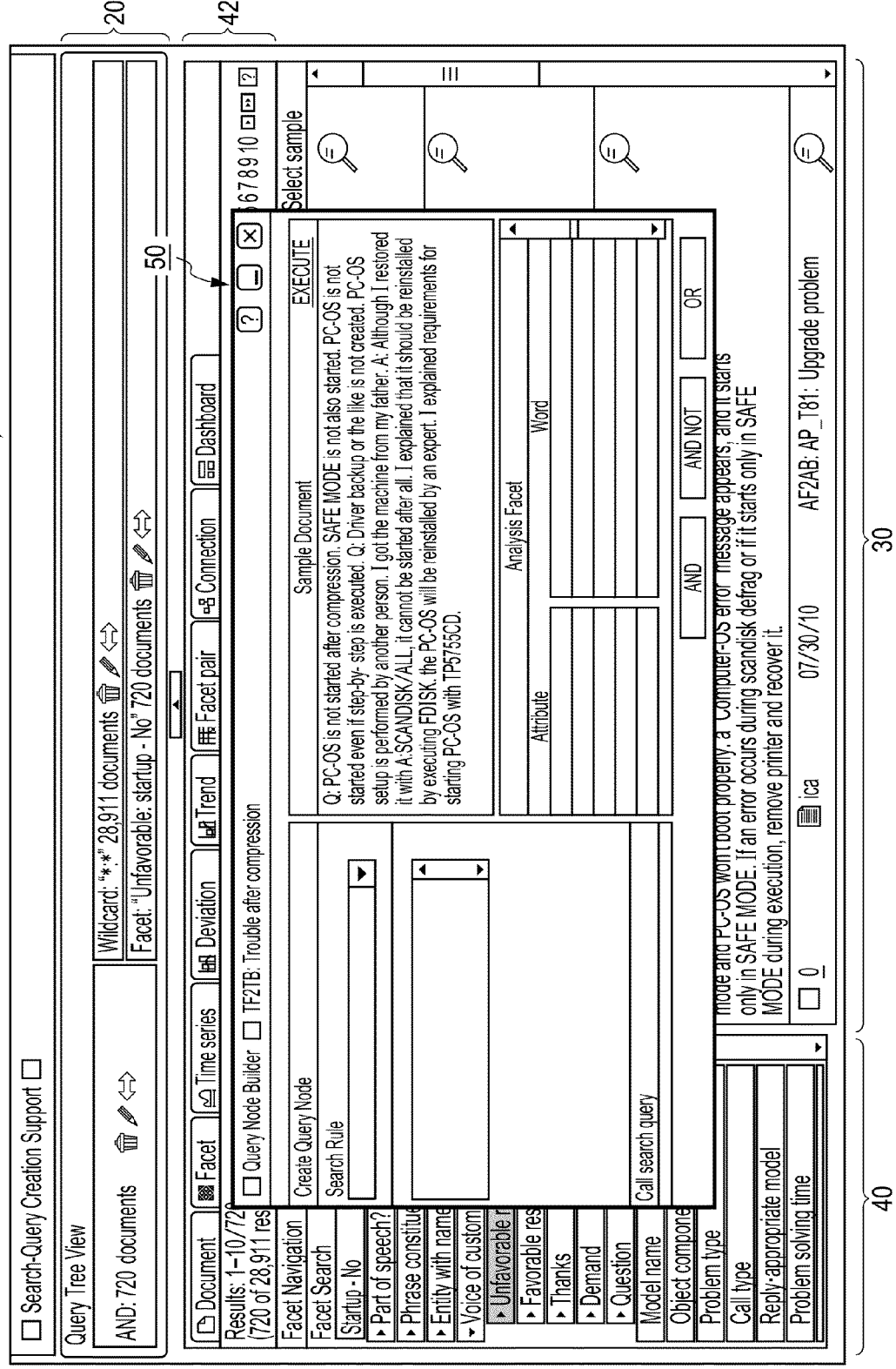
FIG. 4 is a diagram showing the GUI screen on which a query node builder is displayed according to the embodiment.
Figure 5:
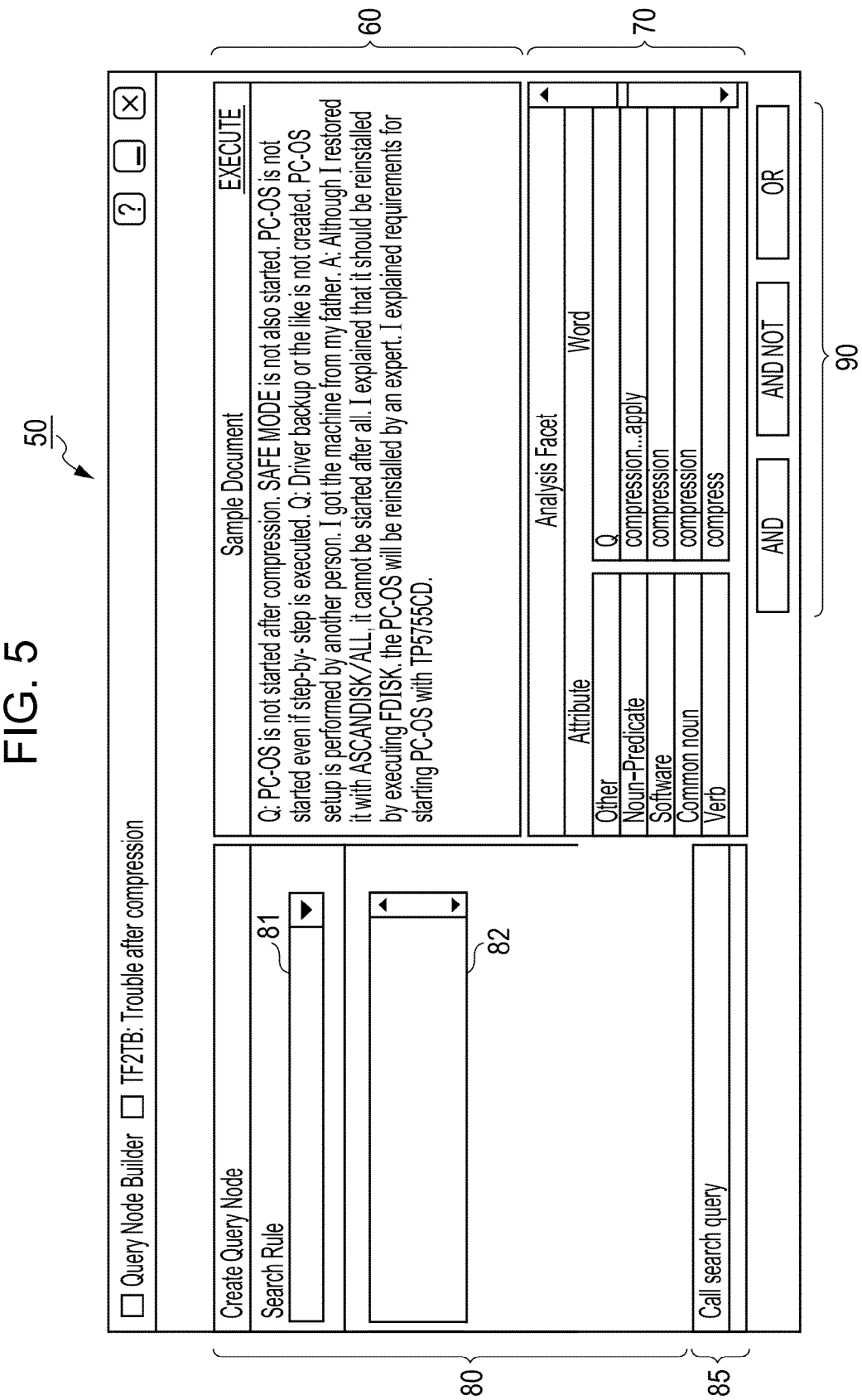
FIG. 5 is a diagram showing the query node builder of the embodiment.

FIG. 4 shows the GUI screen 10 on which a query node builder 50 is displayed. As shown in FIG. 4, the query node builder 50 is displayed as a modeless dialog on the screen on which the query tree view area 20 and the hit-document-list display area 30 are displayed seamlessly. FIG. 5 shows only the query node builder 50 extracted. As shown in FIG. 5, the query node builder 50 includes a sample-document preview area 60, a facet list area 70, a query-node creation assist area 80, and an icon group 90 showing logical operators. The query node builder 50 further includes a search-query call area 85 for calling a stored search query, which will be described later.

The sample-document preview area 60 displays the full text of a sample document selected from the hit-document-list display area 30. The facet list area 70 displays words and their attributes in list form. The GUI creation unit 104 receives words and their attributes included in the sample document from the morphological analysis engine 202 and creates a list thereof (hereinafter referred to as a facet list). The query-node creation assist area 80 has a text field 81 serving as means for selecting a search rule and a search-word-element registration area 82 for entering a word or facet to be a constituent of the query node. The analyst creates a new search word (query node) to be added to the query tree view 12 using these GUIs.

Figure 6:
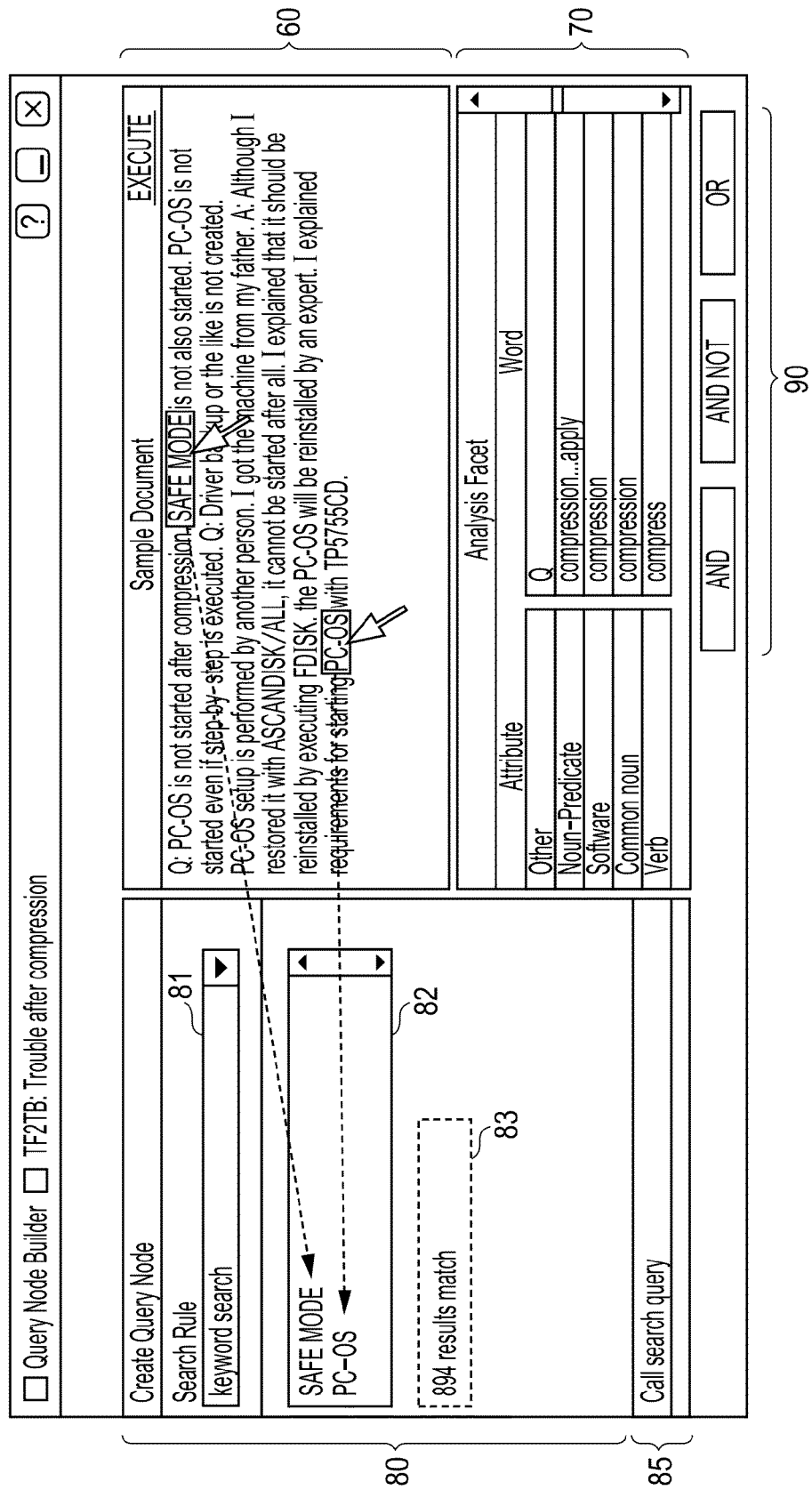
FIG. 6 is a diagram showing the query node builder in which "keyword search" is selected.

Next, referring to FIGS. 6 to 9, the query node builder 50 of this embodiment will be described in more detail. FIG. 6 shows an aspect in which a query node is created by selecting "keyword search" as a search rule. In this case, the analyst first selects a search rule via the text field 81 in the query-node creation assist area 80. The text field 81 is preferably configured as an autocomplete text field. By clicking on a triangular arrow icon in the text field 81, a pull-down selection menu appears which displays a list of all search rules that the document search engine 200 support, such as keyword search, facet search, proximity search, fuzzy search, and wildcard search. The analyst selects "keyword search" from the list by clicking on it. In case the document search engine 200 adds support for new search rules, the new rules can be added to the search rule list in the query node builder 50 as needed. The means for selecting a search rule is not limited to the text field and may include other appropriate GUI components, such as a list box.

Next, the analyst performs a detailed check of the content of text displayed in the sample-document preview area 60, selects at least one suitable keyword therefrom, and drags and drops it into the search-word-element registration area 82. The keyword that was dragged and dropped into the search-word-element registration area 82 is automatically registered as an element candidate of a new search word. In the example shown in FIG. 6, two keywords, "SAFE MODE" and "PC-OS", are registered from the sample-document preview area 60 into the search-word-element registration area 82. In the case where a plurality of keywords are registered in the search-word-element registration area 82, the logical product (AND) thereof is defined as an element candidate. In response to the keywords being registered via the search-word-element registration area 82, the search-query creation unit 102 creates a search formula from those keywords in accordance with the rule of keyword search and stores it in a temporary storage as a candidate of a search word to be added.

In this embodiment, each time a keyword is dragged from the sample-document preview area 60, the search-query creation unit 102 creates in response a search formula from the dragged keyword in accordance with the rule of keyword search and issues it to the document search engine 200 as a search query. The document search engine 200 executes a search using the issued search query and returns the number of hit documents (hereinafter referred to as the number of hits) to the search-query creation support apparatus 100. The GUI creation unit 104 of the search-query creation support apparatus 100 that has received the number of hits from the document search engine 200 displays the number of hits in a number-of-hits display area 83. In the example shown in FIG. 6, the number of hits, "894", when a search formula, "SAFE MODE" PC-OS, is used as a search query is displayed in the number-of-hits display area 83. With the query node builder 50 of this embodiment, the analyst can estimate the validity of a query node (that is, a search word) that is examined to be added to the query tree view 12 (that is, a search query) by checking the number of hits displayed in the number-of-hits display area 83.

Figure 7:
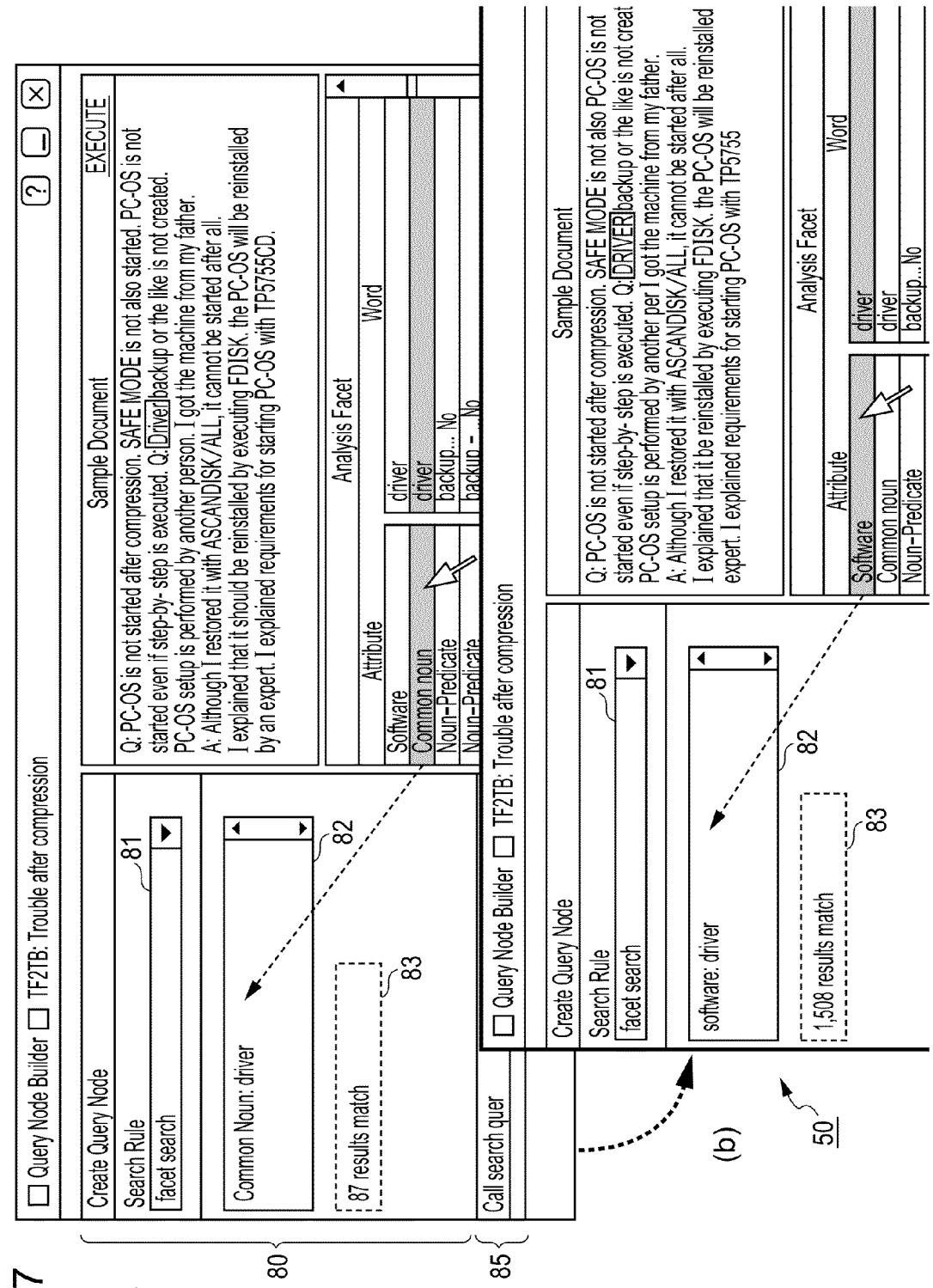
FIG. 7 is a diagram showing the query node builder in which "facet search" is selected.

FIG. 7 shows an aspect in which a query node is created by selecting "facet search" as a search rule. In this case, the analyst first selects "facet search" via the text field 81 of the query-node creation assist area 80 in the same procedure as described above. Next, the analyst selects at least one suitable facet from the facet list displayed in the facet list area 70 and clicks on it. The clicked facet is automatically registered as an element candidate of a new search word and is displayed in the search-word-element registration area 82. In the example shown in FIG. 7(*a*), a clicked facet, "common noun: driver", is displayed in the search-word-element registration area 82. In the case where a plurality of facets are displayed (registered) in the search-word-element registration area 82, the logical product (AND) of the plurality of facets is defined as an element candidate. In response to facets being registered via the search-word-element registration area 82, the search-query creation unit 102 creates a search formula from those facets in accordance with the rule of facet search and stores it in a temporary storage as a candidate of a search word to be added.

Also in this case, each time a facet is clicked in the facet list area 70, the search-query creation unit 102 creates a search formula from the clicked facet in accordance with the rule of facet search and issues it to the document search engine 200 as a search query. The GUI creation unit 104 that has received the number of hits from the document search engine 200 displays the number of hits in the number-of-hits display area 83. In the example shown in FIG. 7(*a*), the number of hits, "87", when a search formula, /"keyword$._word.noun.general"/"driver" is used as a search query is displayed in the number-of-hits display area 83. On the other hand, as shown in FIG. 7(*b*), in the case where a facet, "software: driver", is clicked on, the GUI creation unit 104 displays the number of hits in the case where a search formula created from the facet is set to a search query in the number-of-hits display area 83 in the same procedure. In the example shown in FIG. 7(*b*), the number of hits, "1,508", when a search formula, /"keyword$.sem_software"/"driver" is used as a search query is displayed in the number-of-hits display area 83. With the query node builder 50 of this embodiment, the analyst can estimate the validity of a plurality of similar facets by comparing the numbers of hits, thus allowing a more suitable facet to be selected.

Figure 8:
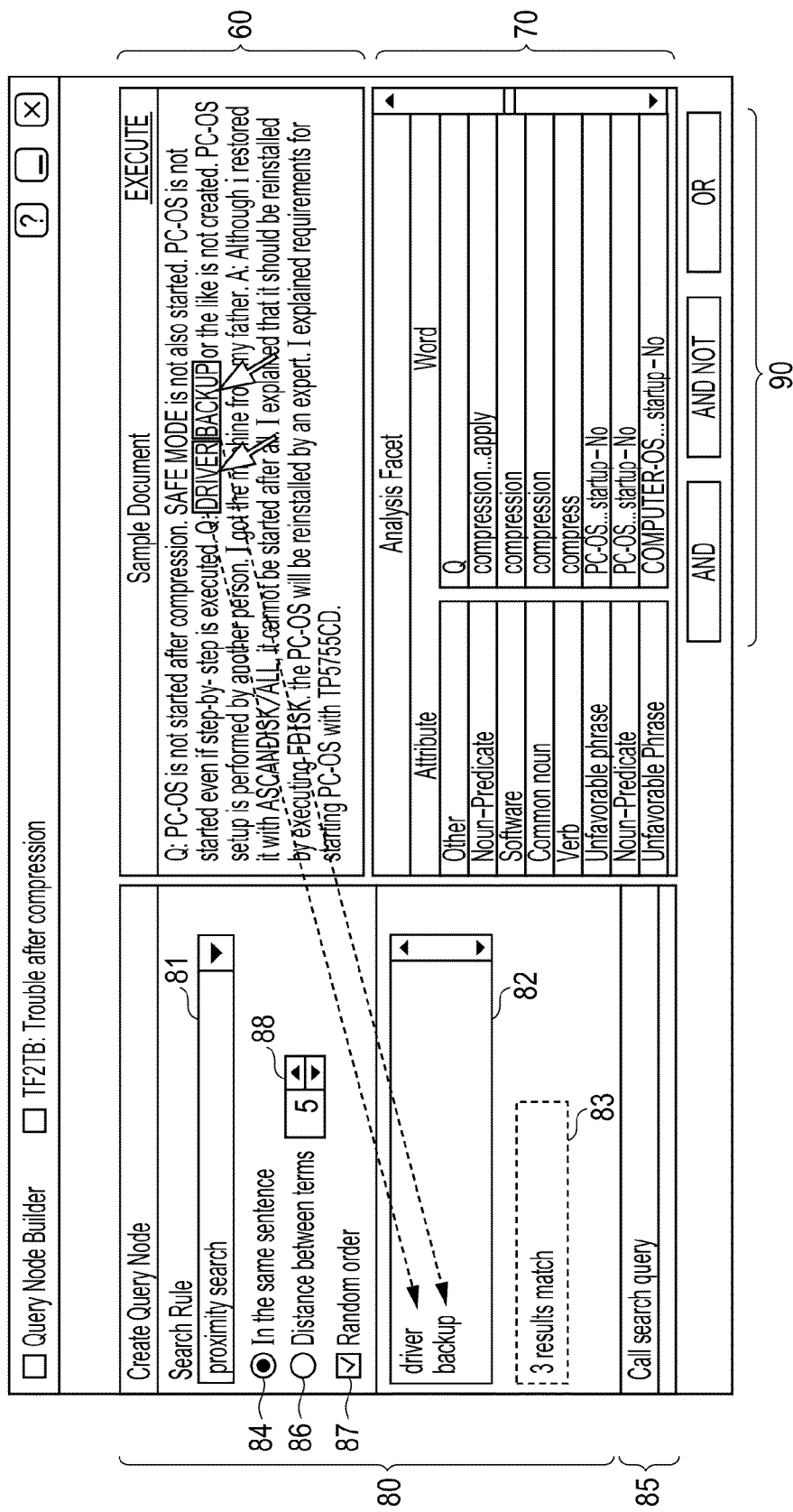
FIG. 8 is a diagram showing the query node builder in which "proximity search" is selected.

FIG. 8 shows an aspect in which a query node is created by selecting "proximity search" as a search rule. In this case, the analyst first selects "proximity search" via the text field 81 of the query-node creation assist area 80 in the same procedure as described above. In response to "proximity search" being selected, the GUI creation unit 104 creates a GUI for setting conditions of proximity search and displays it in the query-node creation assist area 80. Specifically, the GUI includes a radio button 84 for selecting whether to make it a condition that a selected keyword be in one sentence, a radio button 86 for selecting whether to make the distance between keywords a condition, and a check box 87 for selecting whether to make the order of appearance of the keyword a condition. Furthermore, a spin button 88 for entering the distance between the keywords is displayed at the side of the radio button 86.

Next, the analyst performs a detailed check of the content of text displayed in the sample-document preview area 60, selects at least two suitable keywords therefrom, and drags and drops them. In the example shown in FIG. 8, two adjacent keywords, "driver" and "BACKUP" are dragged and dropped from the sample-document preview area 60 into the search-word-element registration area 82. The set of keywords dragged and dropped into the search-word-element registration area 82 is automatically registered as an element candidate of a new search word. In the case where the check box 87 is not checked (that is, conditioned on the order of keyword appearance), the order of appearance (from above to below) in the search-word-element registration area 82 is defined as the order of appearance in the sentence. In response to the keyword set being registered via the search-word-element registration area 82, the search-query creation unit 102 creates a search formula from the keyword set in accordance with the rule of proximity search and stores it in a temporary storage as a candidate of a search word to be added.

Also in this case, each time a keyword is dragged from the sample-document preview area 60, the search-query creation unit 102 creates a search formula from the dragged keyword set in accordance with the rule of proximity search under the conditions set via the buttons 84, 86, and 87 and issues it to the document search engine 200 as a search query. The GUI creation unit 104 that has received the number of hits from the document search engine 200 displays the number of hits in the number-of-hits display area 83. In the example shown in FIG. 8, the number of hits, "3", when a search formula, (driver BACKUP) WITHIN SENTENCE is used as a search key is displayed in the number-of-hits display area 83. With the query node builder 50 of this embodiment, the analyst can estimate the kinds of keywords combined and the validity of their proximity condition by checking the number of hits.

Figure 9:
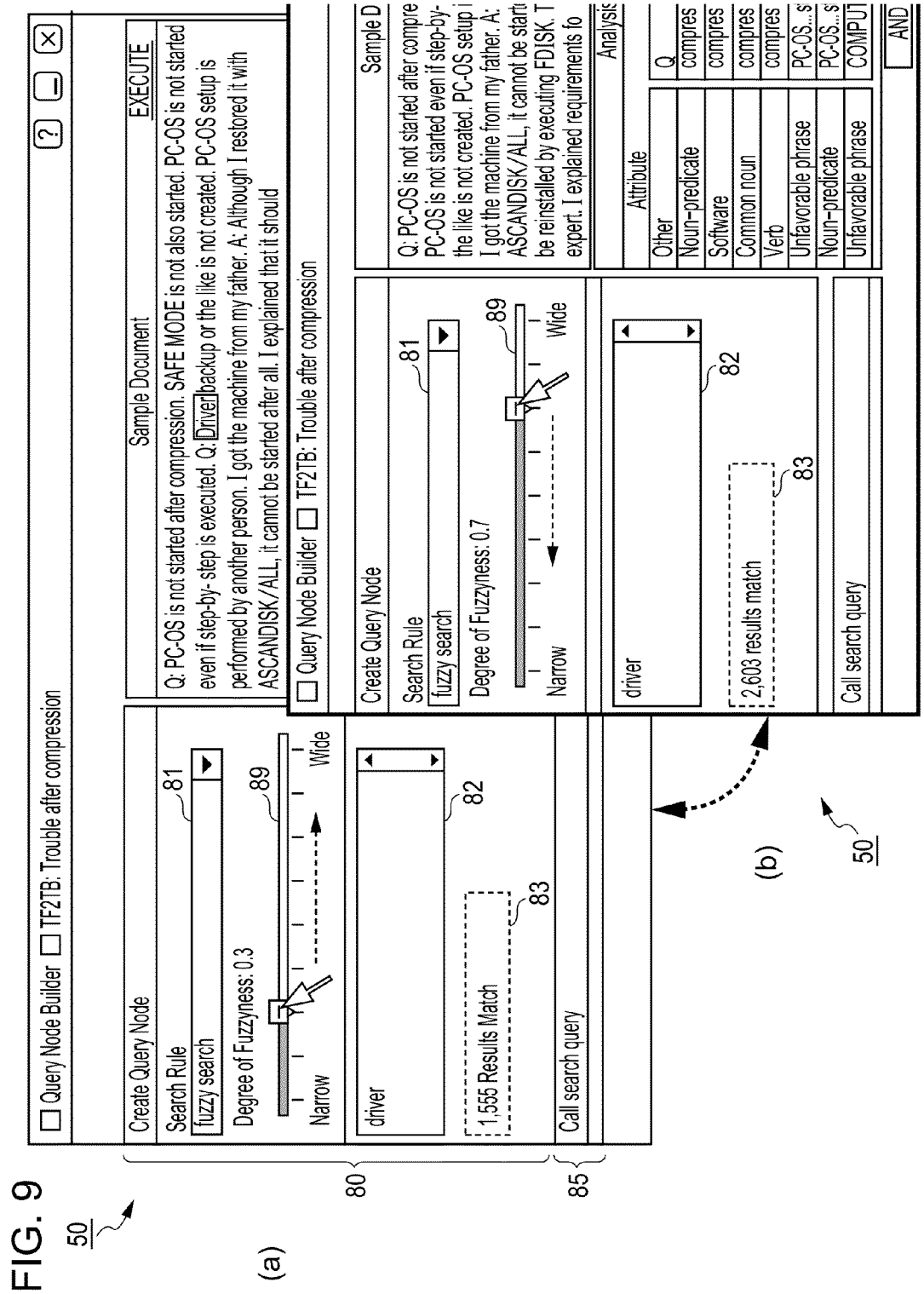
FIG. 9 is a diagram showing the query node builder in which "fuzzy search" is selected.

FIG. 9 shows an aspect in which a query node is created by selecting "fuzzy search" as a search rule. In this case, the analyst first selects "fuzzy search" via the text field 81 of the query-node creation assist area 80 in the same procedure as described above. In response to "fuzzy search" being selected, the query-node creation assist area 80 displays a slider 89 which is a GUI for indicating the degree of fuzziness. Next, the analyst performs a detailed check of the content of text displayed in the sample-document preview area 60, selects at least one suitable keyword therefrom, and drags and drops it into the search-word-element registration area 82. In the example shown in FIG. 9, a keyword "driver" is dragged and dropped from the sample-document preview area 60 into the search-word-element registration area 82. The keyword dragged and dropped into the search-word-element registration area 82 is automatically registered as an element candidate of a new search word. In response to the keyword being registered via the search-word-element registration area 82, the search-query creation unit 102 creates a search formula from the keyword in accordance with the rule of fuzzy search and stores it in a temporary storage as a candidate of a search word to be added.

After dragging and dropping a keyword from the sample-document preview area 60 to the search-word-element registration area 82, the analyst moves a cursor to the right and left on the control of the slider 89 to adjust the degree of fuzziness (also referred to as "fuzzyness", as shown in the figures). The search-query creation unit 102 creates a search formula according to the degree of fuzziness adjusted in accordance with the rule of fuzzy search and issues it as a search query to the document search engine 200. The GUI creation unit 104 that has received the number of hits from the document search engine 200 displays the number of hits in the number-of-hits display area 83. In the example shown in FIG. 9(a) (the degree of fuzziness is "0.3"), the number of hits, "1,555", is displayed, and in the example shown in FIG. 9(a) (the degree of fuzziness is "0.7"), the number of hits, "2,603", is displayed. With the query node builder 50 of this embodiment, the analyst can intuitively set the most suitable degree of fuzziness by checking the number of hits that changes with the motion of the slider 89.

As described above, the query node builder 50 of this embodiment allows the analyst to create a special search syntax (search formula) easily and intuitively even without special knowledge of search rules. Furthermore, since the validity of a search word to be added can be estimated in advance, useless search (including not only an actual search but also a verifying operation thereof) can be avoided. While the function of the query node builder 50 of this embodiment has been described above, an aspect in which a query node created by the query node builder 50 is added to the query tree view 12 will next be described with reference to FIG. 10.

Figure 10:
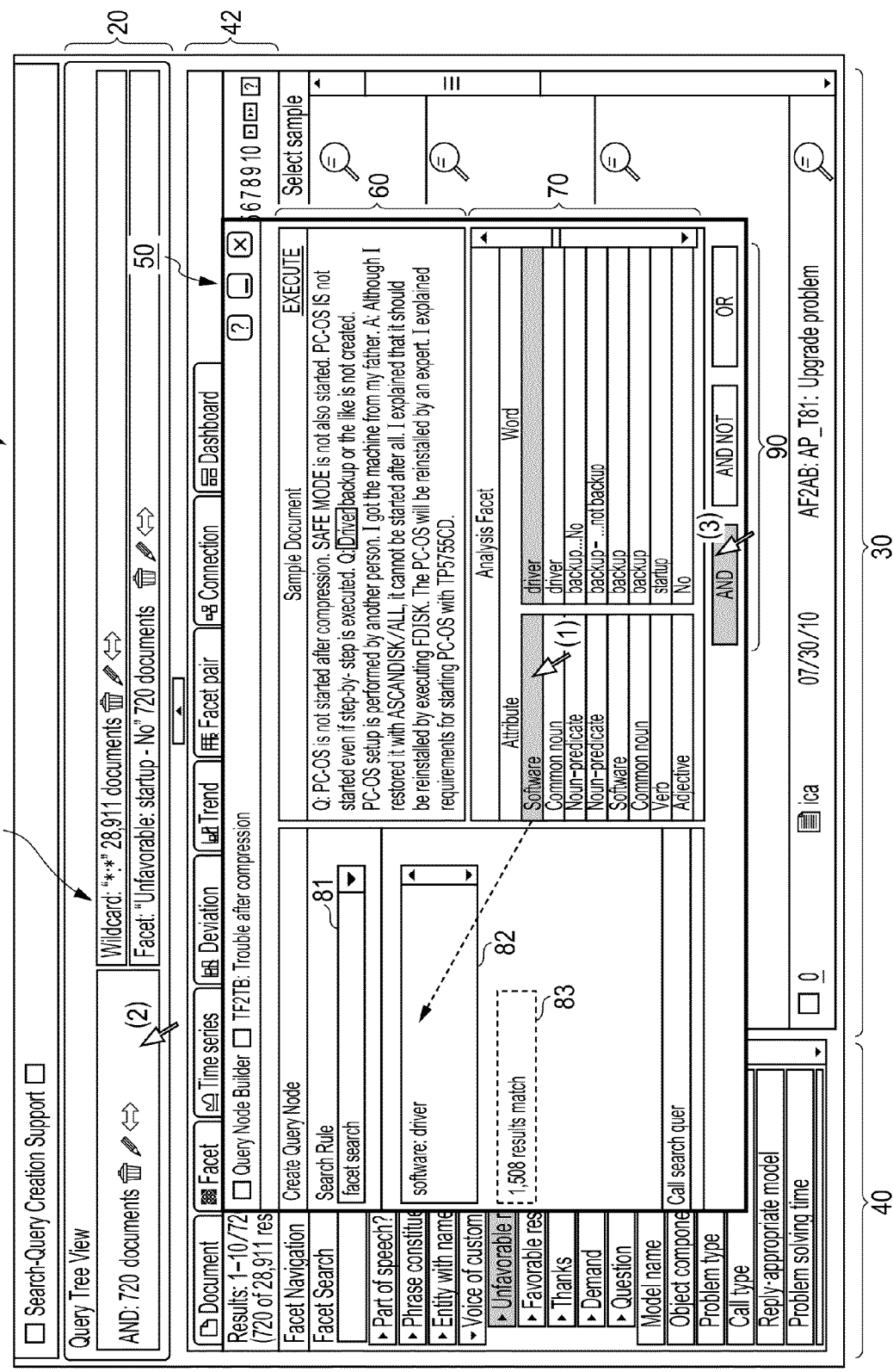
FIG. 10 is a diagram showing an aspect in which a query node is added to the query tree view.
Figure 11:
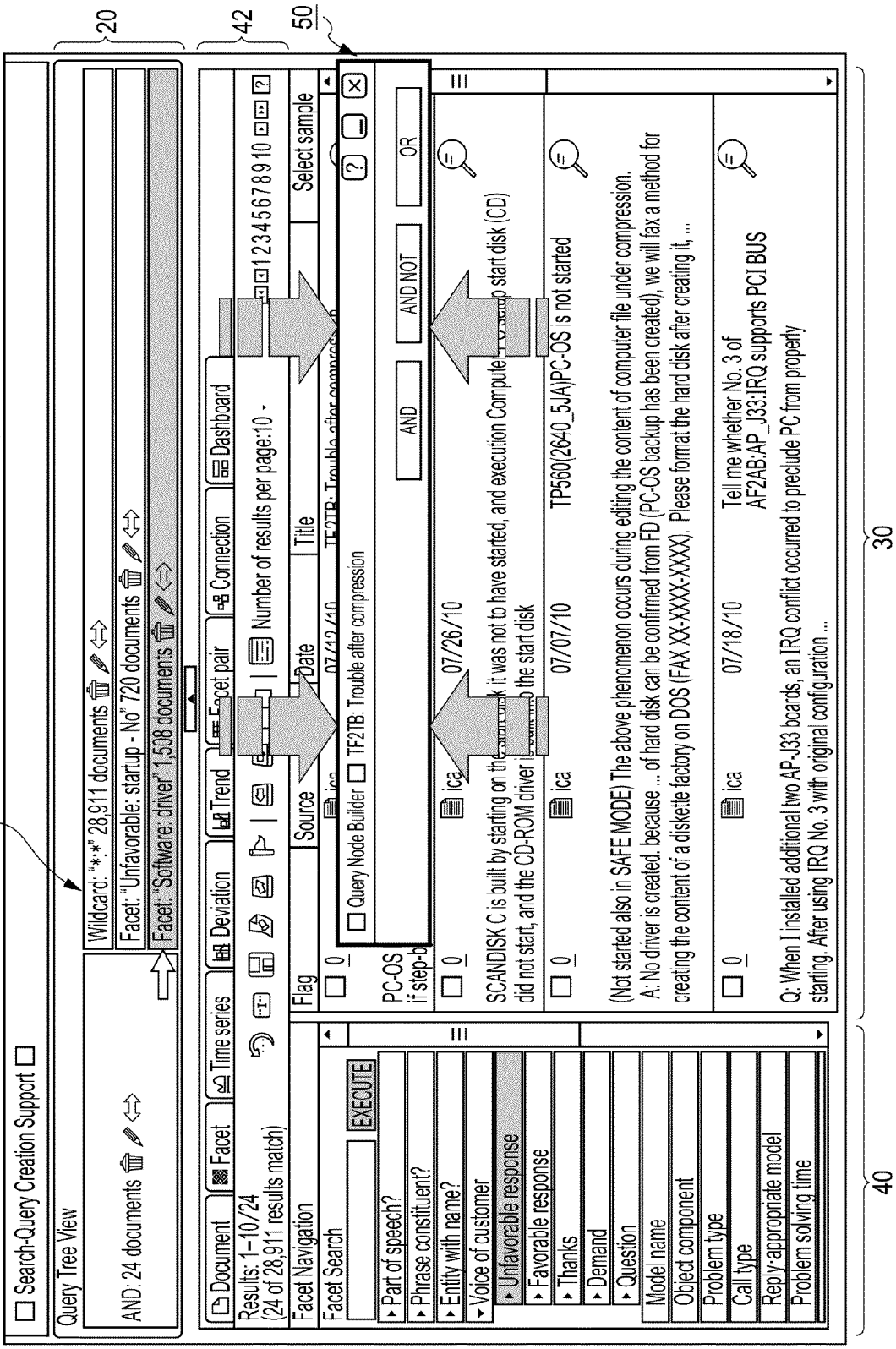
FIG. 11 is a diagram showing the GUI screen in which the query node builder is minimized.
Figure 12:
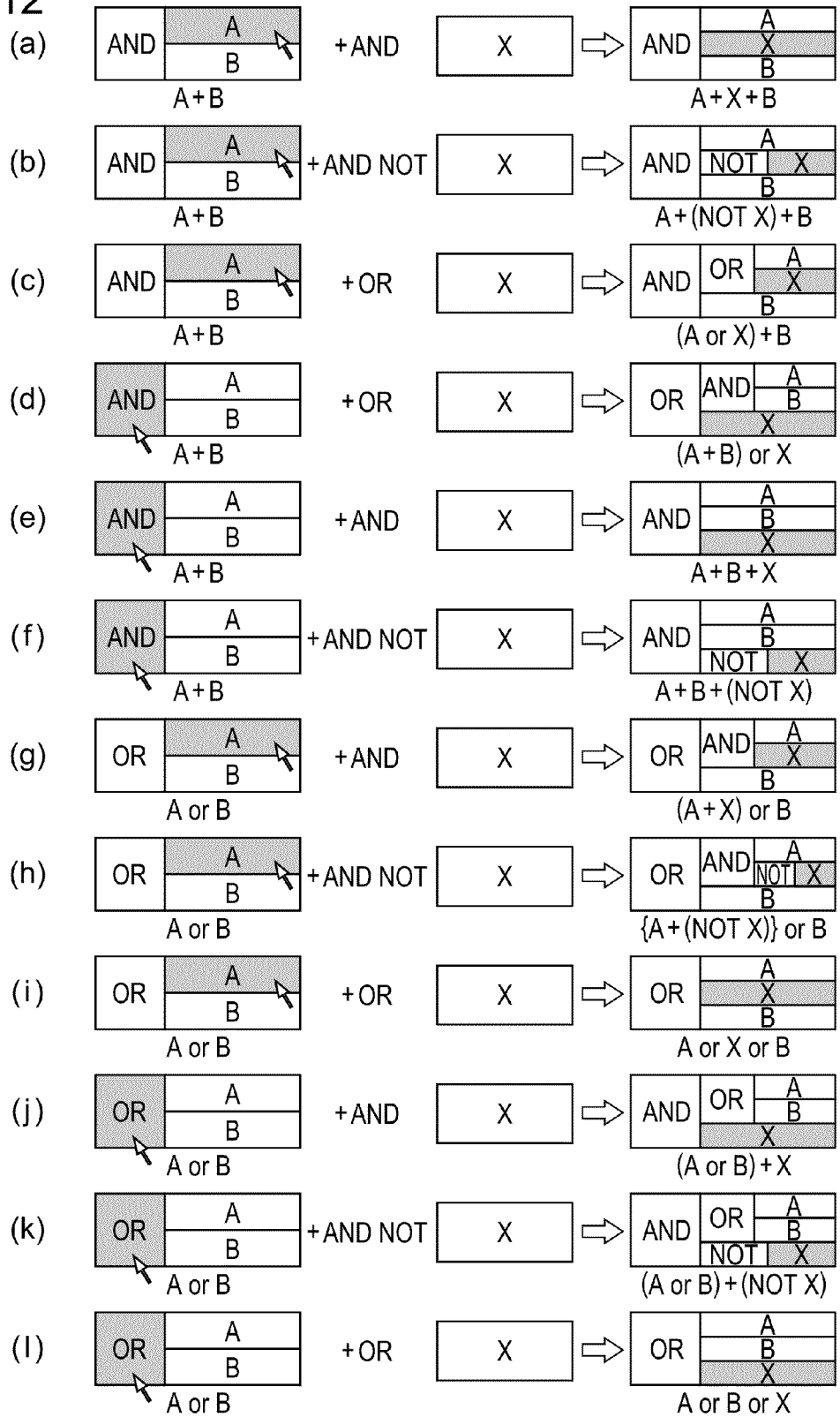
FIG. 12 is a diagram showing an aspect in which a query node is added to the query tree view.

In the example shown in FIG. 10, facet search is selected as a query node search rule. When the analyst selects a facet, [Software: driver], in the facet list area 70 and clicks it, the number of hits, "1,508", is displayed in the number-of-hits display area 83 in response thereto. The analyst who checked the number of hits and determined the validity and thus decided to use the facet search formula [software: driver] as a query node clicks on a logical operator node expressed as [AND: 720 documents] which is the top-level node of the query tree view 12 so that it is designated, and thereafter clicks on "AND" in the icon group 90 indicating logical operators. In response to that, the search-query creation unit 102 creates a new search query in which the search word (search formula) stored in the temporary storage is connected to the present search query shown in the query tree view 12 with the logical operator "AND" and issues it to the document search engine 200. On the other hand, as shown in FIG. 11, the GUI creation unit 104 creates a node icon corresponding to the facet search formula [software: driver] that the query node builder 50 created and displays it in a form in which it is connected to a lower layer closest to the logical operator node expressed as [AND: 720 documents] in the query tree view 12.

FIGS. 12(a) to (l) show other aspects in which a query node is added to a query tree view. In FIG. 12, a query tree view before a query node is added is shown at the left in the plane of the drawing, a query node [X] to be added is shown together with a logical operator in the center of the plane of the drawing, and a query tree view after the query node is added is shown at the right in the plane of the drawing. Search queries (logical formulas) defined by the individual query tree views are shown under the corresponding drawings. In FIGS. 12(a) to (l), a logical operator, "AND", "OR", or "AND NOT", is selected for a node icon designated by the cursor (highlighted), and the query node [X] is added thereto. As shown in FIGS. 12(a) to (l), in this embodiment, either a node icon indicating a logical operator or a node icon indicating a search word constituting the query tree view can be selected and can be added to the query node. As shown in FIGS. 12(a) to (l), the embodiment allows the analyst to easily and intuitively add a query node to the query tree view and to easily ascertain whether it is given an intended logical structure because the logical structure of a search query defined after addition is visualized. Accordingly, even a search query formed of a very long character string containing a plurality of logical operators in a complicated arrangement can be corrected easily, accurately, and quickly.

Referring again to FIG. 11, the description is continued. In response to "AND" in the icon group 90 showing logical operators being clicked on, the query node builder 50, which is displayed as a modeless dialog on a higher level layer of the screen on which the query tree view area 20 and the hit-document-list display area 30 are seamlessly displayed, is minimized. This allows the analyst to refer to the hit-document-list display area 30, which was hidden under the query node builder 50 until then. The hit-document-list display area 30 displays search results (hit document list) obtained using a new search query in which a query node is added. Thus, according to this embodiment, the GUI creation unit 104 minimizes the query node builder 50 at the same time a new search query is issued and displays it so that the hit-document-list display area 30 can be referred to, and thus, the analyst is released from complicated operations, such as opening a search-result display screen expanded separately every time he/she refers to search results, thus allowing quick shifting to verification of the search results.

Next, the analyst performs a detailed check of the content of hit documents displayed in the hit-document-list display area 30 and checks whether expected documents have been extracted using the corrected search query. For example, it can be determined whether something in common (for example, a keyword that appears in common) is found in the hit documents. If sufficient expected documents have not been extracted, the search query may be unsuitable, and thus, the analyst opens the minimized query node builder 50 again, creates a new query node according to the procedure described above to correct the query tree view 12 (that is, search query), and further checks the search results in detail. The analyst repeats such a series of operations. At the point where sufficient expected documents are extracted, the search query is recognized to be useful to find the cause of "compression in OS and problems caused by startup of a computer" and stores it in the following procedure.

Figure 13:
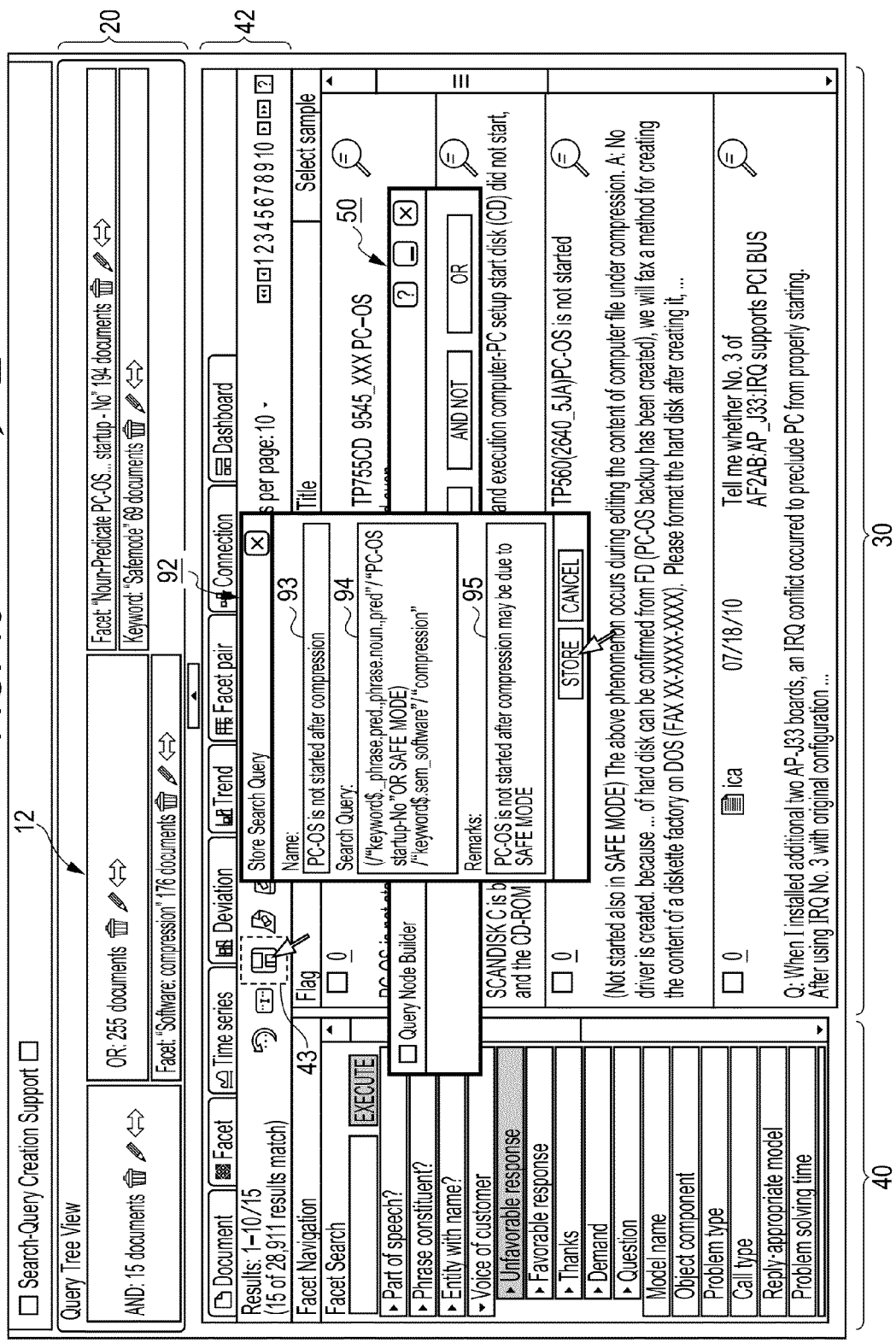
FIG. 13 is a diagram showing a GUI screen for entering a search query.

FIG. 13 shows the GUI screen 10 for saving or storing a search query. When storing a search query, the analyst first clicks on an icon 43, in the toolbar area 42, for storing the created search query. In response, the GUI creation unit 104 displays a search-query storage confirmation dialog 92 in the top-level layer. The search-query storage confirmation dialog 92 includes, in addition to a field 94 for checking and displaying the search formula of the created search query, a text field 93 for entering the name of the search query, and a text field 95 for entering remarks. The analyst gives a suitable name to the created search query and enters it in the text field 93, enters, for example, the purpose of using the search query into the text field 95, and then clicks on a store button. In the example shown in FIG. 13, the analyst checks the content of the hit documents in detail, and as a result, finds that a phrase, "SAFE MODE", appears in common in documents describing "compression in OS and problems caused by startup of a computer". Thus, the analyst determines that the search query is useful to find the relationship between "compression in OS and problems caused by startup of a computer" and "SAFE MODE" and stores it.

Figure 14:
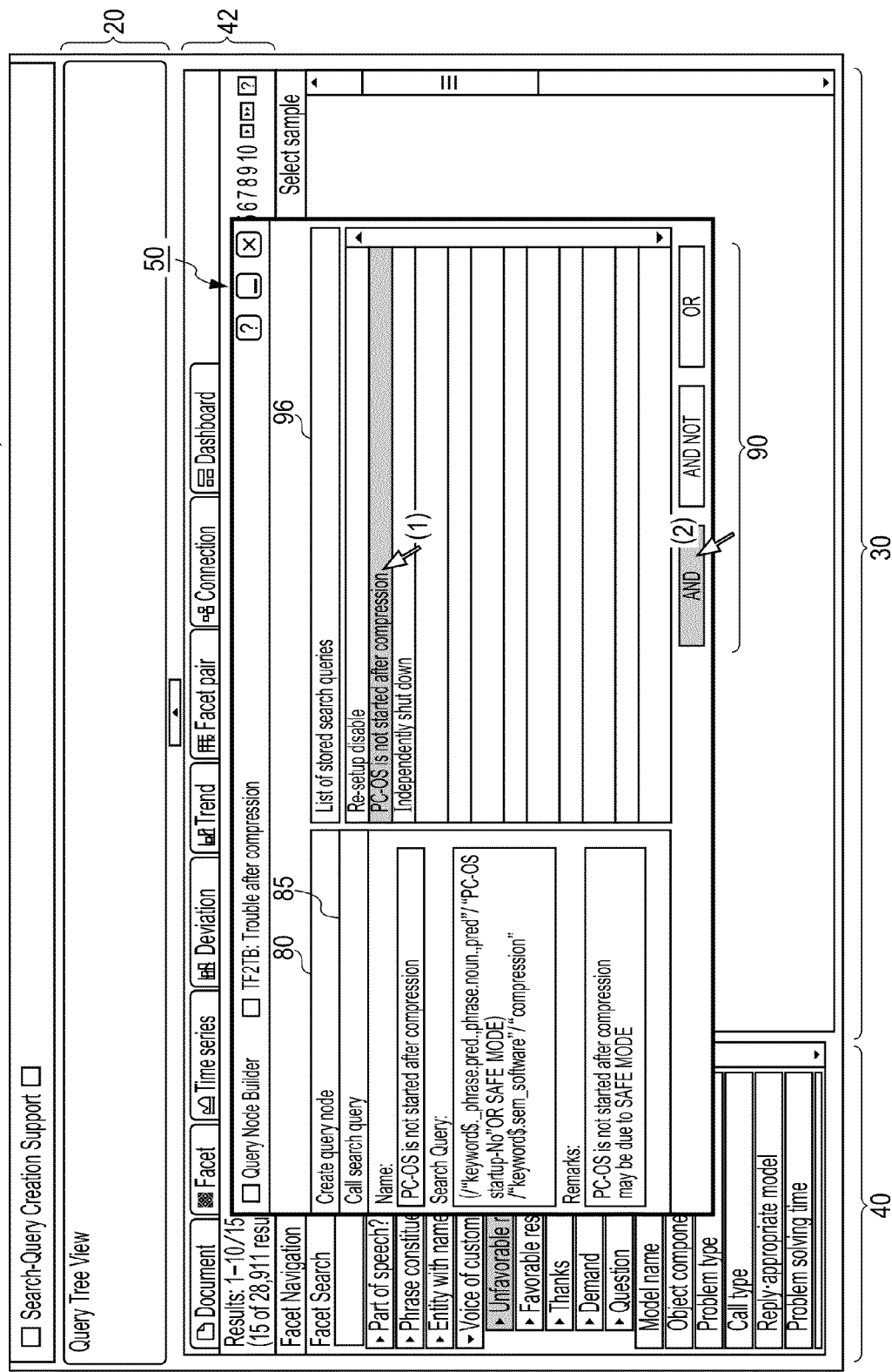
FIG. 14 is a diagram showing a GUI screen for calling a stored search query.

Furthermore, the analyst continues the search for new text groups sent from users from day to day. At that time, the analyst calls a search query stored before and uses it. FIG. 14 shows the GUI screen 10 for calling the stored search query. When calling the stored search query, the analyst first opens the query node builder 50 and clicks a search-query call area 85 under the query-node creation assist area 80. In response, the search-query call area 85 is maximized, and a search-query-list display area 96 opens at the right thereof. The search-query-list display area 96 displays a list of the names of previously stored search queries, and the analyst clicks on the name of a search query to be used from them to select it. In response, the search-query call area 85 displays the name of the of search query, the search query formula, and remarks for checking. After checking displayed content, the analyst clicks on "AND" in the icon group 90 showing logical operators. In response, the GUI creation unit 104 (referring again to FIG. 13) displays the query tree view 12, which is a visualized expression of the logical structure of the selected search query, in the query tree view area 20 and minimizes the query node builder 50. On the other hand, the search-query creation unit 102 issues the selected search query to the document search engine 200. As a result, search results are displayed in the hit-document-list display area 30.

In addition, this embodiment allows the whole of previously stored search queries to be treated as one query node. Specifically, in the case where another query tree view 12 has already been displayed in the query tree view area 20, any node in the query tree view 12 can be designated by clicking, and thereafter, stored search queries can be called from the search-query call area 85, and the icon 90 indicating a desired logical operator can be clicked on. Then, the whole of called search queries are connected to the designated node in the present query tree view 12 by the logical operator. Thus, a search is executed using this new corrected search query.

As described above, according to the present invention, the logical structure of a search query is visualized as a tree view to allow intuitive editing of the tree view, a new search word to be added to the search query is defined as a search word node that can be connected to the tree view, and a GUI window for assisting creation of a search word node to be added to the search query is displayed as a modeless dialog in the higher-level layer of the search-result display screen, so that a series of operations, such as creation, correction, and verification of a search query can be carried out smoothly.

The foregoing functions of the present invention can be achieved by an apparatus-executable program described in an object-oriented programming language, such as, C++, Java (registered trademark), JavaBeans (registered trademark), Java (registered trademark) Applet, JavaScript (registered trademark), Perl, or Ruby, or a database language, such as SQL, and can be distributed as an apparatus-readable recording medium or through transmission.

Although the present invention has been described with reference to the embodiment, it is to be understood that the present invention is not limited to the above embodiment, and modifications within the scope of embodiments that those skilled in the art can consider are included in the scope of the present invention.

What is claimed:

1. A system for generating a graphical user interface to support generation of a search query to be issued to a document search engine, the system comprising:
   a search query creation support apparatus including:
   a GUI creation unit that is operable by the search query creation support apparatus to generate a graphical user interface for supporting generation of a search query, wherein the GUI creation unit generates a query-node creation window that is a GUI window for generating a new search word to be connected to a search query by a logical operator, the query-node creation window including:
   a sample-document preview area that displays a sample document;
   a facet list area that displays facets automatically extracted from the sample document in list form by the GUI creation unit;
   a query-node creation assist area to assist generation of the new search word such that the query-node creation assist area facilitates user selection of one or more search words from the sample-document preview area as well as user selection of one or more facets automatically extracted by the facet list area to add the new search word to the search query; and
   a logical-operator selection icon to select a logical operator that connects the generated search word.

2. The system of claim 1, wherein the query-node creation assist area includes:
   search-rule selection means for selecting a search rule that the document search engine supports; and
   a search-word-element registration area that displays, as an element candidate of the new search word, a word dragged from the sample-document preview area or a facet clicked in the facet list area.

3. The system of claim 2, wherein the query-node creation assist area further includes a number-of-hits display area that displays the number of hit documents as search results using a search formula generated from the word or the facet in accordance with a search rule selected via the search-rule selection means.

4. The system of claim 1, wherein:
   the GUI creation unit is further operable by the search query creation support apparatus to generate a GUI that displays, on the same screen, a query tree view that displays the logical structure of a search query constituted by a logical operator and a search word as a tree view formed of a logical operator node and a search word node, and a hit-document-list display area that displays selectable hit documents as search results using the search query; and
   the query-node creation window is displayed as a modeless dialog on a higher-level layer of the same screen.

5. The system of claim 4, further comprising:
   a search-query creation unit that is operable by the search query creation support apparatus to generate a search query in response to an operation of the GUI.

6. The system of claim 5, wherein the query-node creation assist area comprises:
   search-rule selection means for selecting a search rule that the document search engine supports; and
   a search-word-element registration area for accepting registration of an element candidate of the new search word;

wherein the search-query creation unit, in response to a word or facet included in the sample document being registered as an element candidate via the search-word-element registration area, generates a search formula from the word or the facet in accordance with a search rule selected via the search-rule selection means and stores the search formula as a candidate of the new search word in a temporary storage.

7. The system of claim 6, wherein:
the query-node creation assist area further includes a number-of-hits display area;
the search-query creation unit, in response to the word being dragged or the facet being clicked on, generates a search formula from the word or the facet in accordance with a search rule selected via the search-rule selection means, issues the search formula as a search query to the document search engine, and receives the number of hit documents from the document search engine; and
the GUI creation unit is operable by the search query creation support apparatus to display the number of hit documents in the number-of-hits display area.

8. The system of claim 6, wherein:
the GUI creation unit, in response to a logical operator being designated by the logical-operator selection icon, is operable by the search query creation support apparatus to connect the icon of a node corresponding to the new search word to a lower layer closest to the designated logical operator node or search word node with the logical operator; and
the search-query creation unit is operable by the search query creation support apparatus to generate a new search query by connecting the search formula stored in the temporary storage using the designated logical operator to a search formula indicated by the designated logical operator node or search word node.

9. A computer-executable method to support generation of a search query to be issued to a document search engine, comprising:
generating a graphical user interface (GUI) for supporting generation of a search query, wherein the generated GUI comprises a query-node creation window that is a GUI window for generating a new search word to be connected to a search query by a logical operator, the query-node creation window including:
a sample-document preview area that displays a sample document;
a facet list area that displays facets automatically extracted from the sample document in list form;
a query-node creation assist area to assist generation of the new search word such that the query-node creation assist area facilitates user selection of one or more search words from the sample-document preview area as well as user selection of one or more facets automatically extracted by the facet list area to add the new search word to the search query; and
a logical-operator selection icon to select a logical operator that connects the generated search word.

10. The method of claim 9, further comprising:
generating a search query in response to an operation of the GUI.

11. The method of claim 10, wherein the query-node creation assist area includes:
search-rule selection means for selecting a search rule that the document search engine supports; and
a search-word-element registration area that displays, as an element candidate of the new search word, a word dragged from the sample-document preview area or a facet clicked in the facet list area.

12. The method of claim 11, wherein:
the query-node creation assist area further includes a number-of-hits display area; and
the generating of a GUI includes displaying the number of hit documents in the number-of-hits display area.

13. The method of claim 11, wherein the generating of the search query, in response to the word being dragged or the facet being clicked on, includes generating a search formula from the word or the facet in accordance with a search rule selected via the search-rule selection means, issuing the search formula as a search query to the document search engine, and receiving the number of hit documents from the document search engine.

14. The method of claim 11, further comprising:
in response to a word or facet included in the sample document being registered as an element candidate via the search-word-element registration area, generating a search formula as part of the search query from the word or the facet in accordance with a search rule selected via the search-rule selection means; and
storing the search formula as a candidate of the new search word in a temporary storage.

15. The method of claim 14, wherein the generating of the GUI further comprises:
generating a GUI that displays, on the same screen, a query tree view that displays the logical structure of a search query constituted by a logical operator and a search word as a tree view formed of a logical operator node and a search word node, and a hit-document-list display area that displays selectable hit documents as search results using the search query.

16. The method of claim 15, wherein the query-node creation window is displayed as a modeless dialog on a higher-level layer of the same screen.

17. The method of claim 15, wherein generating a GUI further comprises, in response to a logical operator being designated by the logical-operator selection icon, connecting the icon of a node corresponding to the new search word to a lower layer closest to the designated logical operator node or search word node with the logical operator.

18. The method of claim 17, wherein the generating of a search query further comprises generating a new search query by connecting the search formula stored in the temporary storage using the designated logical operator to a search formula indicated by the designated logical operator node or search word node.

19. The method of claim 11, wherein the query-node creation assist area includes:
search-rule selection means for selecting a search rule that the document search engine supports; and
a search-word-element registration area for accepting registration of an element candidate of the new search word.

20. The method of claim 19, wherein in response to a word or facet included in the sample document being registered as an element candidate via the search-word registration area, the search query generates a search formula from the word or the facet in accordance with a search rule selected via the search-rule selection means and stores the search formula as a candidate of the new search word in a temporary storage.

21. A computer-executable program product comprising a non-transitory apparatus-readable medium with a computer-usable program code for executing the following method:
generating a graphical user interface (GUI) for supporting generation of a search query; and generating a search query in response to an operation of the GUI;

wherein the generation of the GUI comprises generating a query-node creation window that is a GUI window for generating a new search word to be connected to a search query by a logical operator, the query-node creation window including:

a sample-document preview area that displays a sample document;

a facet list area that displays facets automatically extracted from the sample document in list form;

a query-node creation assist area that assists generation of the new search word such that the query-node creation assist area facilitates user selection of one or more search words from the sample-document preview area as well as user selection of one or more facets automatically extracted by the facet list area to add the new search word to the search query; and a logical-operator selection icon that selects a logical operator that connects the generated search word.

* * * * *